(No Model.)
C. W. POSTEN.
Washing Machine.
No. 241,063.                    Patented May 3, 1881.
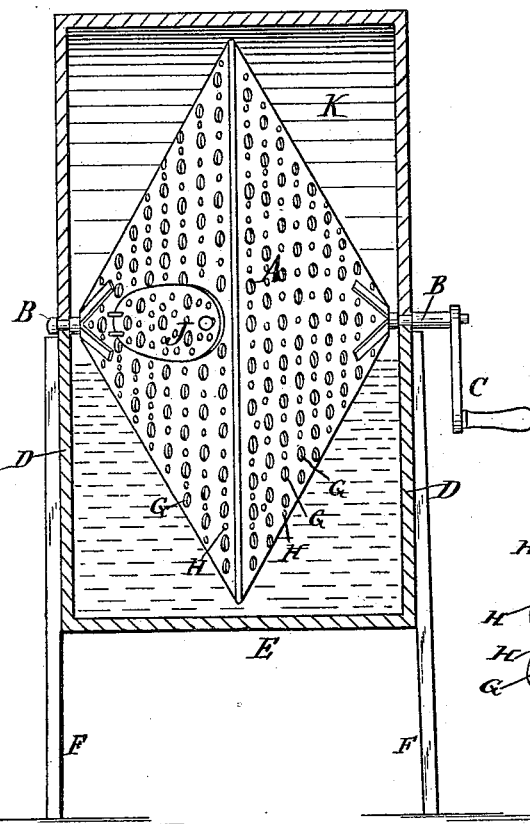
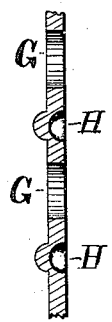
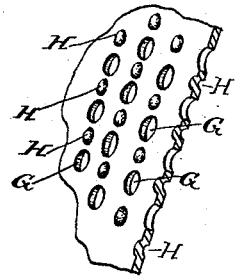
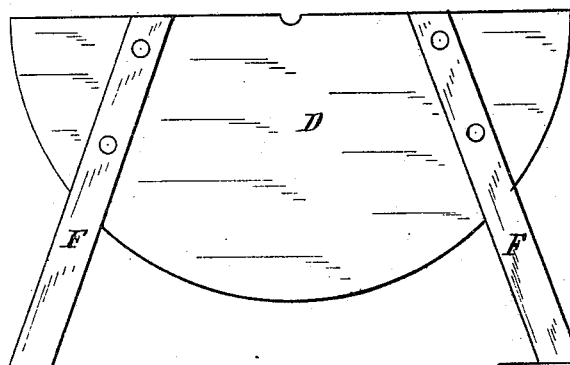
WITNESSES:
Henry N. Miller
C. Sedgwick
INVENTOR:
C. W. Posten
BY Munn & Co
ATTORNEYS.
N. PETERS, Photo-Lithographer, Washington, D. C.

UNITED STATES PATENT OFFICE.

CHARLES W. POSTEN, OF BOONE, IOWA, ASSIGNOR OF ONE-HALF TO REUBEN HOOVER, OF SAME PLACE.

WASHING-MACHINE.

SPECIFICATION forming part of Letters Patent No. 241,063, dated May 3, 1881.

Application filed June 21, 1880. (No model.)

*To all whom it may concern:*

Be it known that I, CHARLES WESLEY POSTEN, of Boone, in the county of Boone and State of Iowa, have invented a new and Improved Washing-Machine, of which the following is a specification.

The object of my invention is to provide a new and improved washing-machine which is simple in construction and effective and convenient in use.

The invention consists of a circular vessel formed of two cones united at their bases, and is provided with a shaft attached to the apex of each cone, and resting on suitable bearings in the sides of a tub or tank adapted to receive it. The double conical vessel has numerous perforations and indentations all over its surface.

In the accompanying drawings, Figure 1 is a cross-sectional elevation of my improved washing-machine. Fig. 2 is a side elevation of the tank of the same. Fig. 3 is a detail view of a part of the double conical vessel. Fig. 4 shows an edge view in section, with the indentations and perforations.

Similar letters of reference indicate corresponding parts.

The circular vessel is composed of two metal cones united at their base edges, and is provided with journals attached to the apex of each cone, and then resting on suitable bearings in the sides D D of the semicircular tank or tub E, adapted to receive the vessel A, and provided with legs F, or other suitable supports, and a semicircular lid, K.

C is a crank formed on the extension of one of the journals B, by means of which the vessel A is rotated in the tub.

The vessel A is provided throughout with numerous perforations, G, which may be arranged in rows or irregularly, and is also provided throughout with numerous indentations, H, projecting toward the interior of the vessel. The vessel is provided with a door, J, through which the clothes are passed.

The clothes having been placed into the vessel, the same is rotated, thus causing the articles to be thrown toward the periphery of the vessel, where they are held for a short time, as this is the narrowest part and is roughened on the inside by the indentations H. At the same time the water passes through the perforations G G into the vessel A, and through the articles, which are thrown about in the vessel, and by striking (rubbing) against the roughened inner surfaces are cleaned, and are then washed out by the suds passing through them.

Having thus described my invention, what I claim as new, and desire to secure by Letters Patent, is—

In combination with the suds-box K, the metal vessel A, provided with perforations G, knobs H, and journals B, substantially as shown and described.

CHARLES W. POSTEN.

Witnesses:
   D. E. SMITH,
   S. C. WOOD.